United States Patent
Hayashi (10) Patent No.: US 6,748,193 B2
(45) Date of Patent: Jun. 8, 2004

(54) MECHANISM FOR RETAINING PLATEN GLASS USED TO READ ORIGINAL IN COURSE OF BEING FED IN IMAGE READER

(75) Inventor: Eiichi Hayashi, Saitama (JP)

(73) Assignee: Fuji Photo Optical Co., Ltd. (JP)

( * ) Notice: Subject to any disclaimer, the term of this patent is extended or adjusted under 35 U.S.C. 154(b) by 84 days.

(21) Appl. No.: 10/106,160

(22) Filed: Mar. 26, 2002

(65) Prior Publication Data

US 2002/0141799 A1 Oct. 3, 2002

(30) Foreign Application Priority Data

Mar. 30, 2001 (JP) ........................................ 2001-102634

(51) Int. Cl.7 ............................................... G03G 15/00
(52) U.S. Cl. ........................ 399/361; 399/377; 399/379
(58) Field of Search .................................. 399/361, 365, 399/377, 379, 380; 248/205.1, 206.5, 309.1, 309.4

(56) References Cited

U.S. PATENT DOCUMENTS 4,616,796 A * 10/1986 Inoue ..................... 248/206.5
5,227,846 A * 7/1993 Leonard et al. ............. 399/213
5,338,018 A * 8/1994 Nagao et al. ............... 271/3.05

FOREIGN PATENT DOCUMENTS

| JP | 06281215 | 10/1994 |
| JP | 07334873 | 12/1995 |
| JP | 08149434 | 6/1996 |

* cited by examiner

*Primary Examiner*—Hoan Tran
(74) *Attorney, Agent, or Firm*—Price, Heneveld, Cooper, DeWitt & Litton, LLP (57) ABSTRACT

A mechanism for retaining a platen glass of an image reader adapted to irradiate original in the course of being fed and thereby to pick up image information wherein the platen glass used to read the original in the course of being fed is supported by a guide plate comprising a combination of a relatively thin glass supporting plate and a relatively thick plate supported directly on a frame of the image reader so that the platen glass is not damaged even if a force is carelessly exerted thereon. A magnetic interconnection between the plates allows a gap to be selectively provided for smoothly feeding an original. Shock absorbing strips also allow different thickness originals to be fed through the gap.

10 Claims, 10 Drawing Sheets

MECHANISM FOR RETAINING PLATEN GLASS USED TO READ ORIGINAL IN COURSE OF BEING FED IN IMAGE READER

BACKGROUND OF THE INVENTION

1. Field of the Invention

The present invention relates to an image reader and particularly to a mechanism for retaining a platen glass mounted on a stationary or moving original type image reader in a region where the irradiation of the original is effectuated.

2. Description of the Related Art

An image reader, such as a copying machine or scanner, adapted to read original image data recorded on paper sheet or the like for subsequent various kinds of processing is generally constructed so that the original is irradiated with light beams emitted from a light source lamp such as fluorescent lamp. Light beams reflected on the original are guided to enter a light receiving station provided with a photoelectric converter device such as a CCD (Charge-Coupled Device). In the case of the image reader for a stationary original, for example, like an image scanner as described in Japanese Laid-Open Patent Application No. 1997-330395, the original is placed on the platen glass is irradiated with light beams emitted from said light source lamp which is moved relative to said original. Moving original image readers are also well known, for example, like the image reader disclosed in Japanese Laid-Open Patent Application No. 1996-125806 or the optical scanner disclosed in 1997-179213, in which the original in the course of being fed is irradiated with light beams emitted from a light source lamp placed at a fixed position. It is also well known that the image reader of a stationary original is incorporated with the original feeder mechanism to be used in the stationary original mode as well as in the moving original mode.

An image reader adapted to be used in the stationary original mode as well as in the moving original mode has usually been provided on the lid serving to cover the original placed on the platen glass with the original feeder mechanism. There is provided the light source lamp adapted to be moved to the position at which the original in the course of being fed can be irradiated with light beams emitted from this light source lamp. It is also well known that the one and same image reader is provided with the platen glass exclusively used to read the original in the course of being fed and the platen glass exclusively used to read the stationary original. As the platen glass exclusively used to read the original in the course of being fed, the band-shaped platen glass has usually been used since the original running on this platen glass is irradiated with light beams emitted from the light source lamp.

However, the platen glass exclusively used to read the original in the course of being fed has sometimes been damaged due to its band-like shape. Except when the stationary original is placed on the platen glass, this platen glass is covered and concealed with the lid and, for example, if the user carelessly puts his or her elbow upon the lid and a load exceeding a predetermined value is exerted upon the lid, the platen glass may be flexed and even broken. To avoid such flexion of the platen glass, the platen glass has conventionally been supported on a relatively thick retaining plate.

The moving original runs on the upper surface of the platen glass used to read the original in the course of being fed and, if the original can not smoothly run thereon, it is difficult to read the image recorded on this original at high accuracy. It is also well known to provide above the platen glass original feeding members such as rollers and guide members so that a gap may be ensured between the platen glass and these original feeding members including the guide members appropriate for smooth running of the original.

The original feeding members such as the guide members are mounted on the lid. When the image reader is used in the stationary original mode, after the original has been set on the predetermined position with the lid opened, the image reading is started with the lid closed again to eliminate any effect of ambient light. During operation of setting the original on the predetermined position, the original is sometimes slidably moved on the platen glass. In this case, the original may inconveniently enter the gap possibly defined between the platen glass and the other members such as the glass retaining member. To avoid this inconvenience, the platen glass must be in close contact with the other members such as the glass retaining member.

However, on account of recently increasing demand for improvement in performance as well as compactness of image readers, the conventional mechanism for retaining the platen glass used to read the original in the course of being fed may be accompanied with problems as will be described. To achieve the performance improvement of the image reader, the image recorded on the original must be sharply and clearly reproduced. To this end, it is required that the light source lamp has brightness as high as possible, and the light source lamp is located as closely as possible to the original. If the light source lamp can be placed close to the original, the image reader can be correspondingly thinned and the demand for compactness also can be satisfied. However, with the conventional platen glass retaining plate which is relatively thick, it is difficult or impossible to reduce the distance between the light source lamp and the original and thereby to satisfy the demand for improvement in performance as well as in compactness. Additionally, the relatively thick retaining plate makes weight-saving of the image reader difficult.

To avoid difficulties encountered when that the original might be inserted into a gap between the platen glass and the other members, such as the glass retaining member, it may be contemplated to keep the platen glass in close contact with the glass retaining member. However, a height of the lid on which the guide member is mounted necessarily increases by a dimension corresponding to the gap which should be ensured between the platen glass and the guide member, resulting in that the image reader may become bulky.

SUMMARY OF THE INVENTION

In view of the problems as have been described above, the present invention aims to miniaturize the image reader by improving the platen glass retaining plate used to read the original in the course of being fed so that this retaining plate can be formed as thin as possible. Furthermore, the present invention aims to provide the mechanism for retaining the platen glass exclusively used to read the original in the course of being fed in the image reader improved so that, with the lid opened, the platen glass comes in close contact with the glass retaining member to prevent the original from being inserted between these platen glass and glass retaining member and, with the lid closed, the platen glass is slightly moved downwardly to form an appropriate gap between the platen glass and the guide member of the original feeder and the original can be smoothly fed through this gap.

The object set forth above is achieved, according to one aspect of the present invention, by a mechanism for retaining a platen glass exclusively used to read an original in the course of being fed in an image reader adapted to irradiate said original with light beams from a light source lamp placed at a predetermined position, to pick up light beams reflected on said original and thereby to read an image formed on said original. The mechanism is characterized by said platen glass functioning to guide said original in an appropriately stretched and flattened state in the course of feeding said original retained by retaining means in operative association with a frame of the image reader. The retaining means comprises a glass supporting member having one end on which said platen glass is placed and supported and a member on which the other end of said glass supporting member is placed and supported and which is supported on said frame. Said glass supporting member is formed of a relatively thin plate material and said member to be supported on said frame is formed of a relatively thick plate material.

Even if a load tending to flex the platen glass is carelessly exerted upon the platen glass, the sufficiently thick members directly supported on the frame prevent the platen glass from being significantly flexed and damaged. Furthermore, the platen glass is placed and supported on the relatively thin glass supporting member, so the platen glass can be put close to the light source lamp and the original running on the platen glass also can be put close to the light source lamp. With such structure, it is possible to irradiate the original with light beams of high brightness and thereby to make the image adequately clear to obtain the image information of desired quality. In addition, the distance between the original and the light source lamp can be reduced and thereby the size of the image reader can be thinned.

The object set forth above is achieved, according to another aspect of the present invention, by a mechanism for retaining a platen glass exclusively used to read an original in the course of being fed in an image reader adapted to irradiate said original with light beams from a light source lamp placed at a predetermined position, to pick up light beams reflected on said original and thereby read an image formed on said original. The mechanism is characterized by said platen glass functioning to guide said original in an appropriately stretched and flattened state in the course of feeding said original retained by retaining means in operative association with a frame of the image reader. The retaining means comprises a glass supporting member having one end on which said platen glass is placed and supported and a member on which the other end of said glass supporting member is placed and supported and which is supported directly on said frame. Said glass supporting member is formed of a relatively thin plate material and said member supported directly on said frame is formed of a relatively thick plate material, and there is provided a magnet above said other end of said glass supporting member so that said glass supporting member is spaced from said member supported directly on said frame as said glass supporting member is magnetically attracted to and engaged with said magnet and said glass supporting member is released from a restrain under a magnetic force of said magnet and placed on said member supported directly on said frame as a load higher than a predetermined value is exerted upon the platen glass.

It is assumed that a load higher than a predetermined value is exerted upon the platen glass due to the weight of the lid having been closed to cover the platen glass. Thereupon, the glass supporting member is moved downwardly against the magnetic attraction by the magnets and placed and supported on the members directly supported on the frame. With the lid opened again, the glass supporting member is moved upwardly under the magnetic force of the magnets. More specifically, the platen glass is moved upwardly and brought in contact with the glass supporting member as the lid is opened, so any gap is not left between the platen glass and the glass supporting member into which the original might be inserted. With the lid closed, the platen glass is moved downwardly to define an appropriate gap between the platen glass and the guide member of the original feeder and the original can be smoothly fed through this gap.

According to one preferred embodiment of the mechanism for a platen glass exclusively used to read an original in the course of being fed in an image reader, shock absorbing means is interposed between said member supported directly on said frame and this frame. If a load is carelessly exerted upon the platen glass, the shock absorbing means can absorb such load and prevent the platen glass from being significantly flexed.

The object set forth above is achieved, according to still another aspect of the present invention, by a mechanism for retaining a plate-like member adapted to retain said plate-like member at a desired position in the absence of a load higher than a predetermined value, to move said plate-like member from said desired position to the other position in the presence of the load higher than the predetermined value and to move said plate-like member, upon removal of said load higher than the predetermined value, back to said desired position. The mechanism is characterized by said plate-like member formed of a magnetic substance, and there is provided a magnet so as to be opposed to said plate-like member, said predetermined position is defined by a state in which said plate-like member is magnetically attracted to and engaged with said magnet, and, under a load higher than the predetermined value, said plate-like member is disengaged from said magnet against its magnetic force. Upon removal of said load, said plate-like member is again magnetically engaged with said magnet.

When a load exceeding the magnetic force of the magnets is exerted upon the plate-like member, the plate-like member is moved from a predetermined position to the other position against the magnetic force of the magnets. Upon removal of the load, the plate-like member is forcibly moved back to the predetermined position under the magnetic force of the magnets. The magnitude of the load under which the plate-like member is disengaged from the magnets can be adjusted by selectively varying the area of the plate-like member over which the plate-like member is magnetically engaged with the magnets.

These and other features, objects and advantages of the present invention will become apparent upon reading the following description thereof together with reference to the accompanying drawings.

DETAILED DESCRIPTION OF THE EMBODIMENTS

Figure 10:
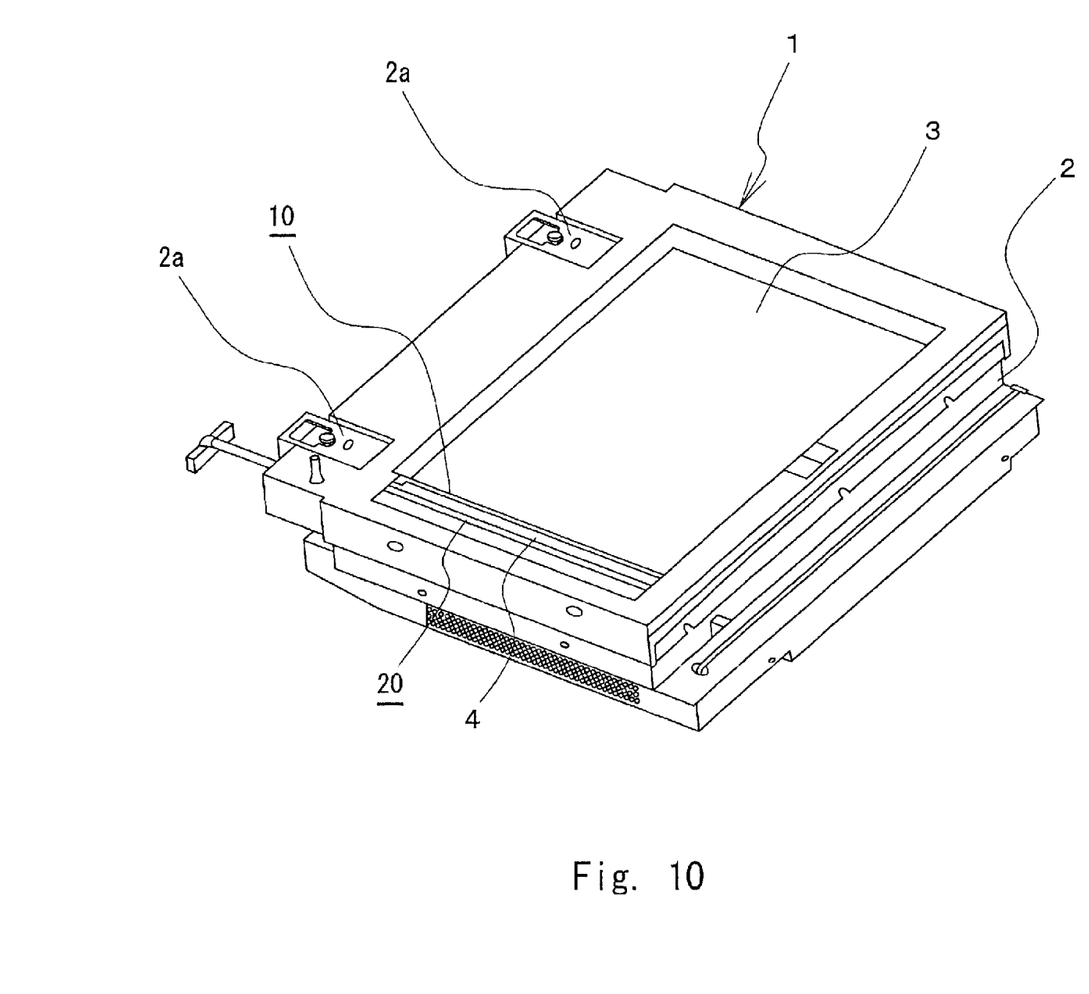
FIG. 10 is a perspective view showing the image reader provided with the mechanism according to the present invention for retaining the platen glass used to read the original in the course of being fed.

Referring initially to FIG. 10, there is shown a perspective schematic view showing the basic body of the image reader 1 provided with the mechanism according to the present invention. As used herein, references to "front" and "rear" typically relate to the direction of motion of a moving original through the image reader. Reader 1 includes the platen glass used to read the original in the course of being fed, in which the basic body of the image reader 1 is covered with a lid or cover (not shown in FIG. 10). In the body of the image reader 1, various components, such as a full rate carriage, a half rate carriage and a drive mechanism for the carriages, are conventionally installed within the casing 2. A main platen glass 3 used to read a stationary original is mounted on the basic body of the image reader 1 so as to cover most of the top of this casing 2. An auxiliary platen glass 4 exclusively used to read a movable original in the course of being fed is mounted on the basic body of the image reader 1 adjacent the main platen glass 3. A back wall of the casing 2 is provided on its top surface with hinge seats 2a for the hinges allowing the lid to be pivotally supported and to be opened or closed around these hinges.

Figure 2A:
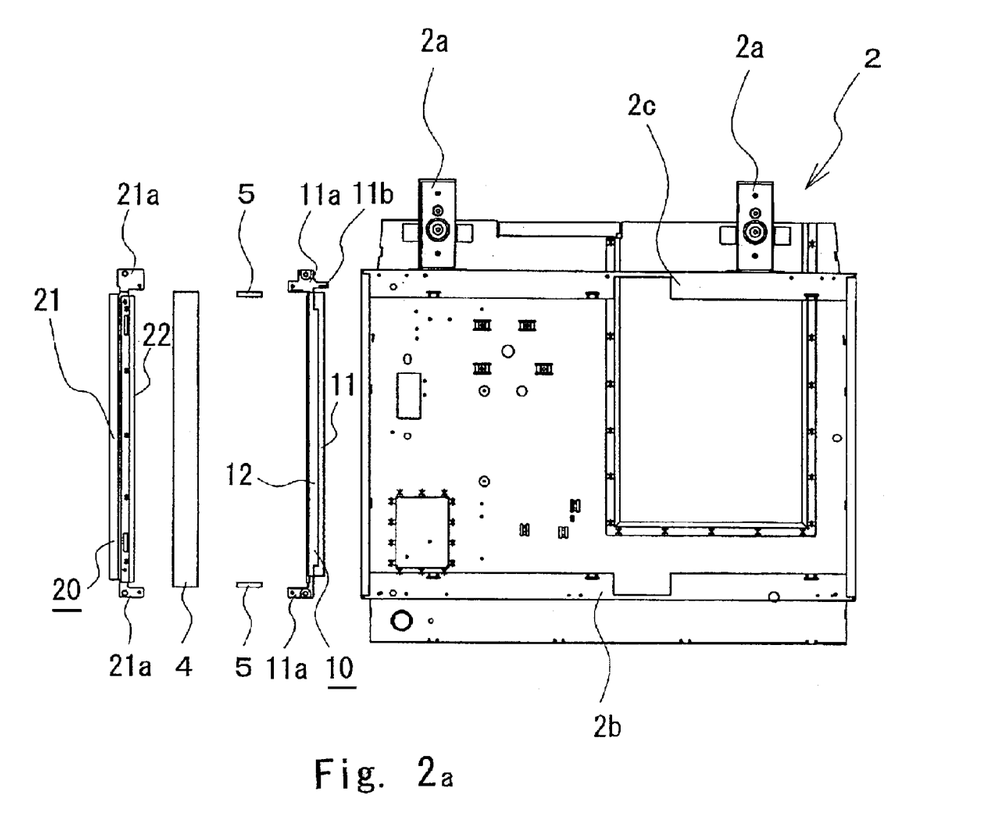
FIG. 2a is an exploded top plan view of the image reader provided with the mechanism according to the present invention for retaining the platen glass used to read the original in the course of being fed.
Figure 2B:
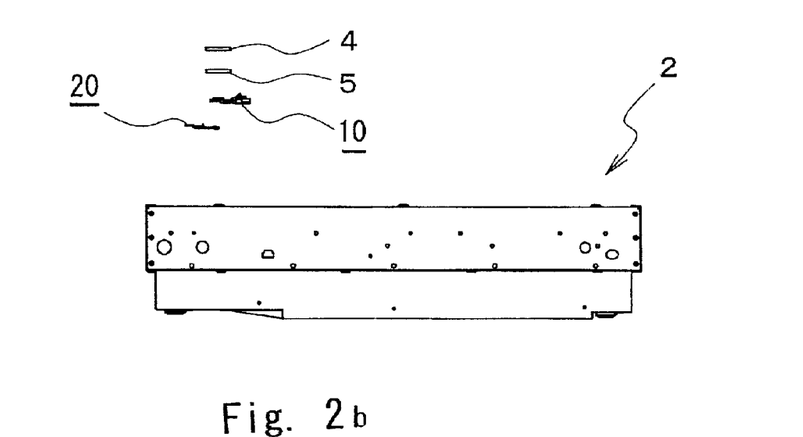
FIG. 2b is an exploded front view of the image reader provided with the mechanism according to the present invention for retaining the platen glass used to read the original in the course of being fed.

As seen in FIGS. 2a and 2b, the casing 2 is box-shaped and formed of sheet metal by appropriately working this, for example, bending, welding and screw setting. The auxiliary platen glass 4 is mounted on the top of this casing 2 along its left side. The lid (not shown in FIGS. 2a and 2b) is provided with a conventional original feeding device adapted to feed the original from the left end of the casing 2 (as seen in FIG. 2b) so as to run first above the auxiliary platen glass 4 and then above the main platen glass 3 (FIG. 10). The casing 2 is further provided on its top along its front and rear sides with a front top-plate 2b and a rear top-plate 2c, respectively, to form the frame of the image reader casing 2.

Between the auxiliary platen glass 4 and the main platen glass 3, there is positioned a rear guide plate 10 mounted on the casing 2 so that respective longitudinally opposite ends of platen glasses 4 and 3 may be placed on the front and rear top-plates 2b, 2c, respectively, as seen in FIG. 10. Outside the auxiliary platen glass 4, a front guide plate 20 (FIGS. 1, 2a, 2b, and 10) is mounted on the casing 2 with longitudinally opposite ends of this guide plate 20 mounted by ends 21a on the front and rear top-plates 2b, 2c, respectively.

Figure 1:
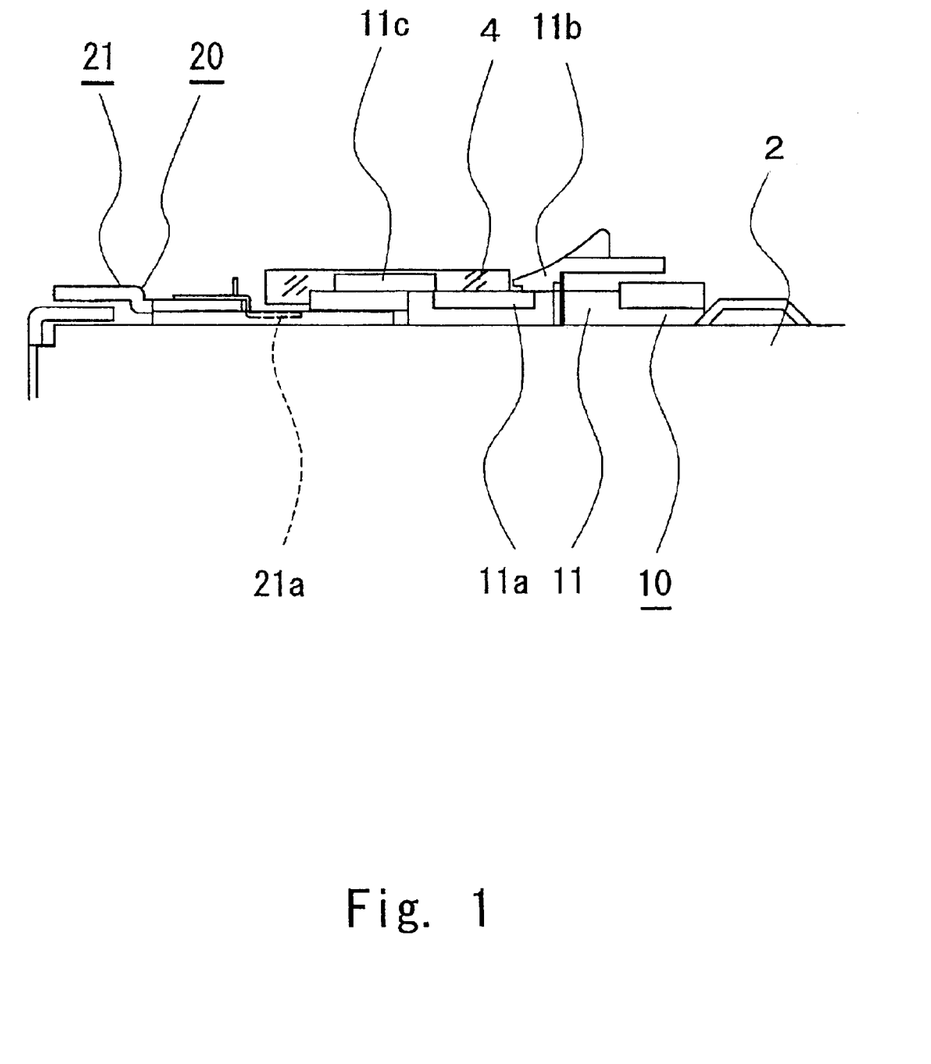
FIG. 1 is a fragmentary enlarged vertical sectional view showing the mechanism according to the present invention for retaining a platen glass used to read an original in the course of being fed into the image reader shown in FIG. 4.
Figure 8:
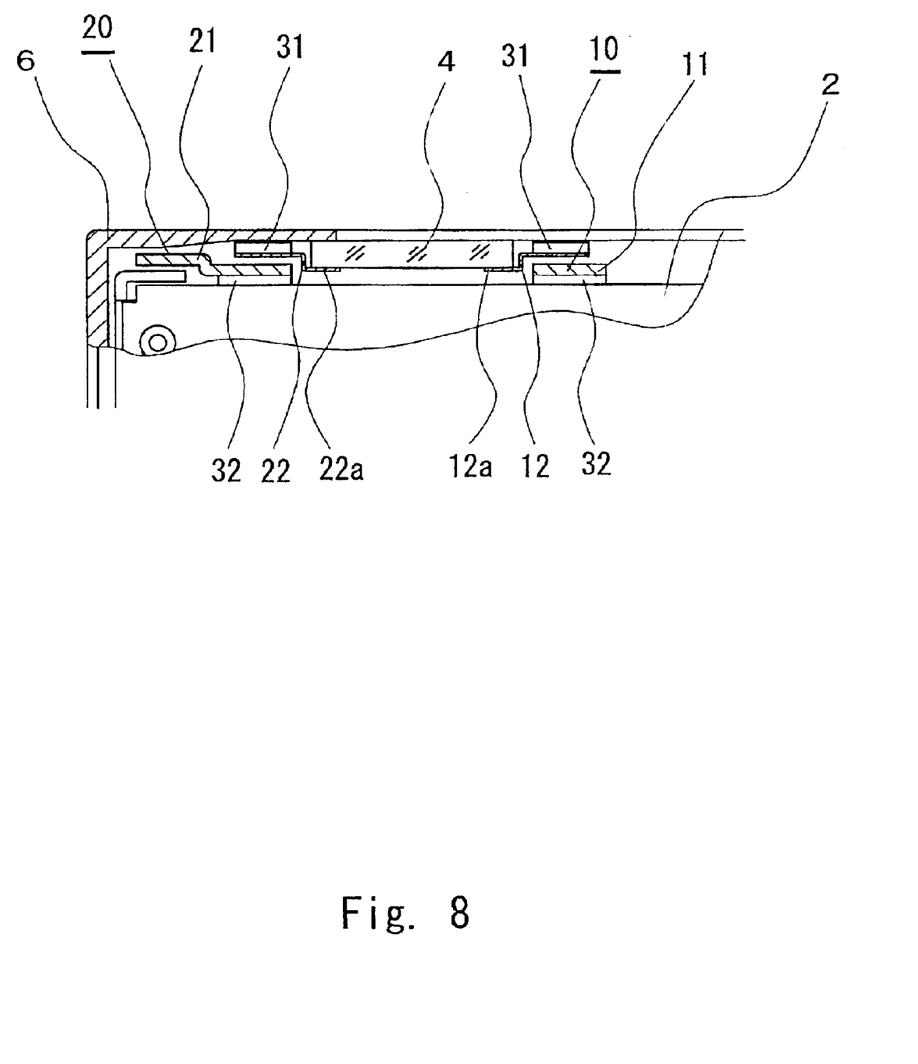
FIG. 8 is a fragmentary enlarged sectional view of the casing shown in FIG. 7 with the lid opened.

As will be best understood from FIGS. 1, 2a and 2b, the rear guide plate 10 comprises an assembly including a rear support plate 11 formed of relatively thick steel plate material, such as about 3 mm thickness, and a rear glass supporting plate 12 formed of relatively thin steel plate material, such as about 1 mm thickness. The rear supported plate 11 lies adjacent the main platen glass 3 and its opposite ends 11a overlap and are mounted to the front and rear top-plates 2b, 2c, respectively. The rear glass supporting plate 12 has its rear side edge 12a placed on and supported by the rear supported plate 11 and lies adjacent the auxiliary platen glass 4 (FIG. 8). As also best seen in FIG. 8, the rear glass supporting plate 12 is bent in crank-like shape so that its front side edge is lower and defines a rear glass supporting edge 12a. The rear side edge of the auxiliary platen glass 4 is placed and supported on this rear glass supporting edge 12a.

Opposite ends of the rear supported plate 11 are formed with supporting plate portions 11a enlarged in the transverse direction of the auxiliary platen glass 4 and fastened to the front and rear top-plates 2b, 2c, respectively, by means of set screws. In this way, the rear guide plate 10 is fixed. One of the supporting plate portions 11a (FIG. 1) is formed with a guide 11b (FIG. 2a) adapted to prevent the original from running in a zigzag direction. The supporting plate portions 11a are further formed on respective inner ends with control tongues 11c (FIG. 1) projecting upwardly so that an end surface of the auxiliary platen glass 4 placed on these supporting plate portions 11a may be brought in contact with these control tongues 11c to laterally position the auxiliary platen glass 4.

Referring to FIGS. 1, 2a and 2b, the front guide plate 20 comprises an assembly including a front support plate 21 formed of relatively thick steel plate material, such as about 3 mm thickness, and a front glass supporting plate 22 (FIG. 2a) formed of relatively thin steel plate material, such as about 1 mm thickness. The front support plate 21 lies adjacent the left end of the casing 2 and has its longitudinally opposite ends 21a placed on the front top-plate 2b and the back top-plate 2c, respectively. The front glass supporting plate 22 has its front side edge placed and supported on the front support plate 21 and lies adjacent the auxiliary platen glass 4. As best seen in FIG. 8, the front glass supporting plate 22 is bent in crank-like shape so that its front side edge is lower and defines a front glass supporting edge 22a. The front side edge of the auxiliary platen glass 4 is placed and supported on the top of this front glass supporting edge 22a. Under longitudinally opposite ends of the auxiliary platen glass 4, strips 32 of spongy rubber are inserted, respectively.

Opposite ends of the front support plate 21 are enlarged in the transverse direction of the auxiliary platen glass 4 to form supporting plate portions 21a which are fastened to the front and rear top-plates 2b, 2c, respectively, by means of set screws. In this manner, the front guide plate 20 is fixed. The operation of the mechanism for retaining the platen glass exclusively used to scan the original in the course of being fed will be described on the basis of the illustrated embodiments.

Figure 3:
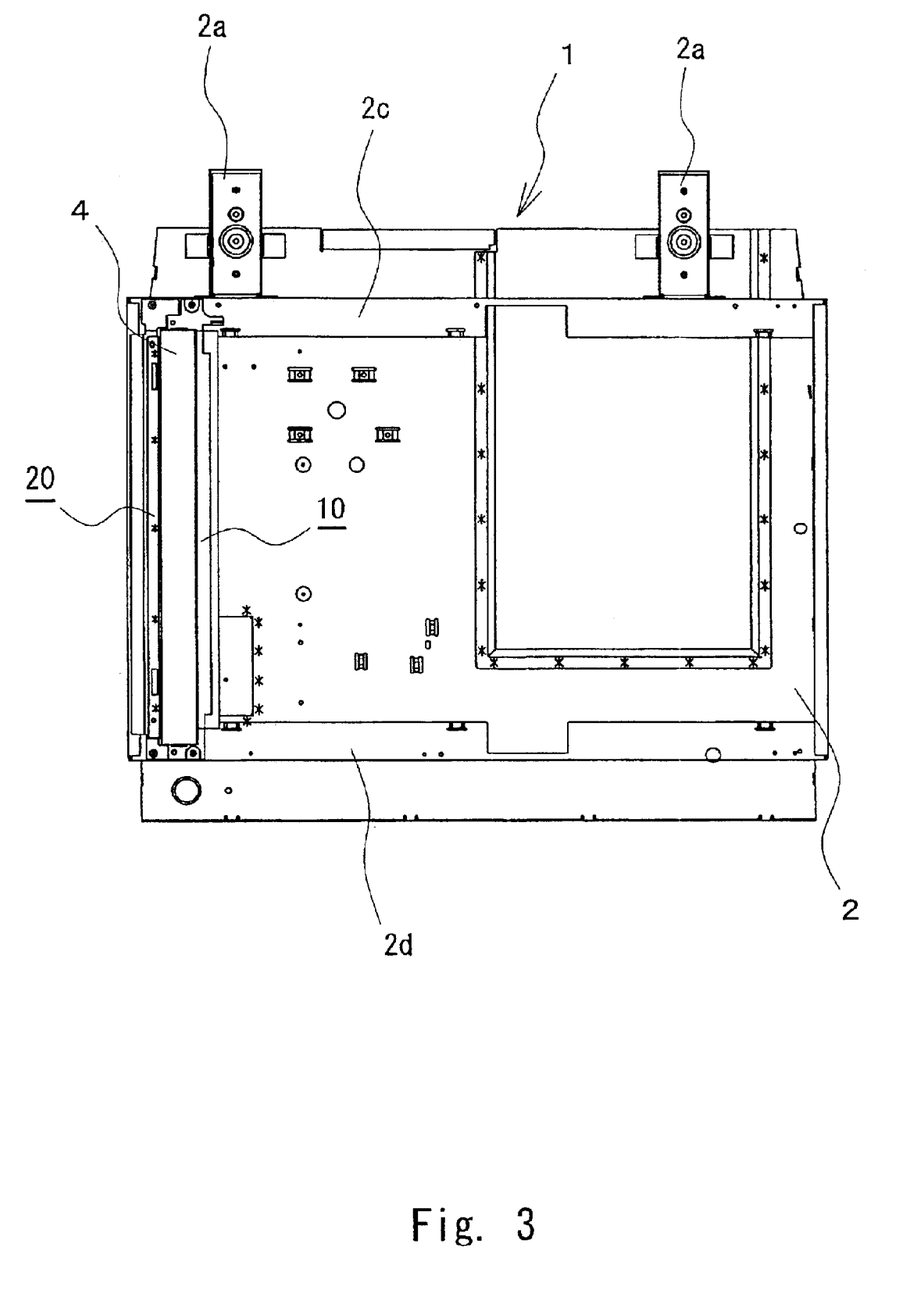
FIG. 3 is a top plan view of the casing of the image reader suitable for being provided with the mechanism according to the present invention for retaining the platen glass used to read the original in the course of being fed, with this platen glass mounted on the image reader.
Figure 4:
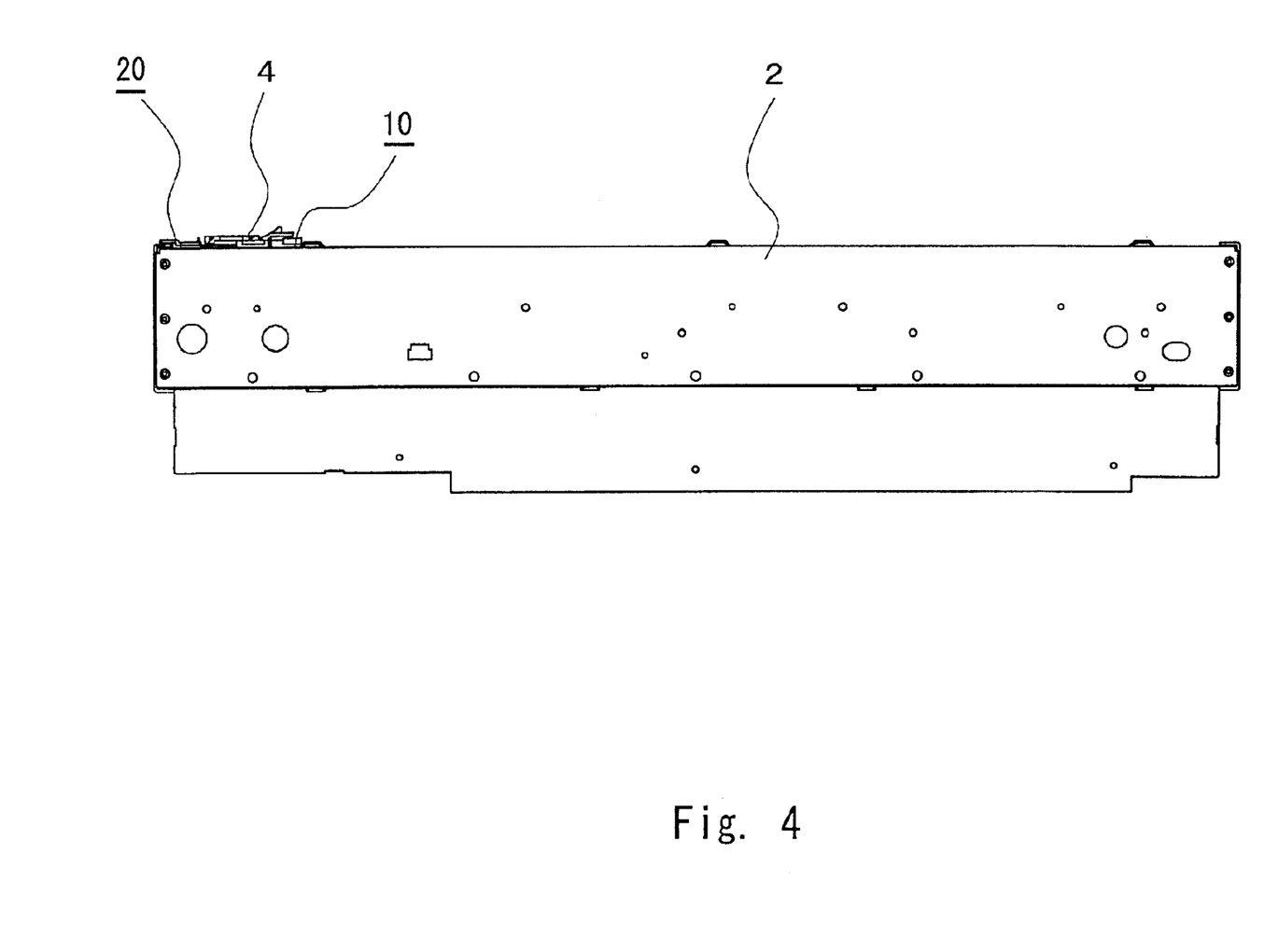
FIG. 4 is a front view of the casing shown in FIG. 3.
Figure 5:
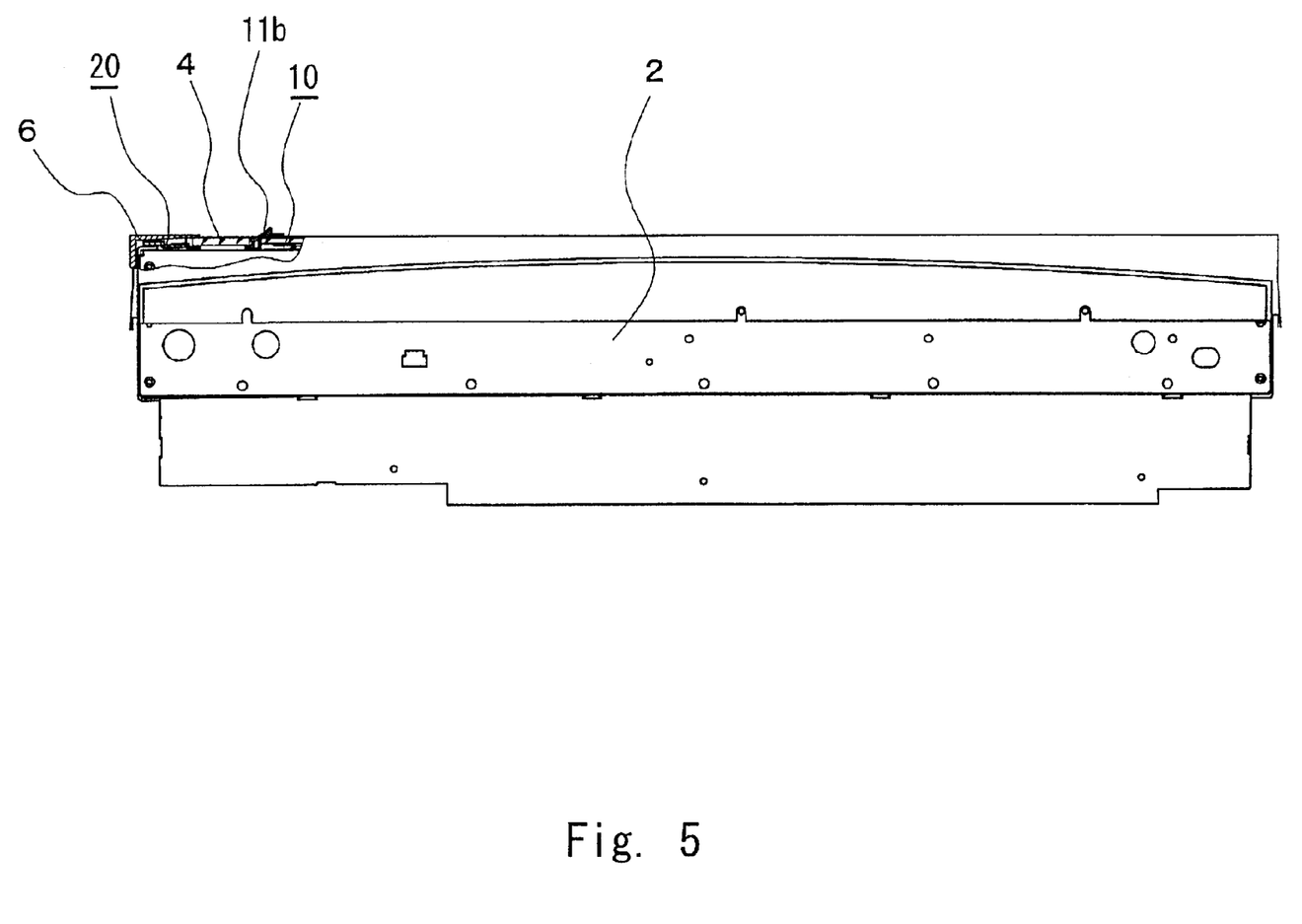
FIG. 5 is a front view of the casing shown in FIG. 4 with the lid installed.

FIG. 3 is a plan view of the image reader with the auxiliary platen glass 4 mounted on the casing 2. The rear guide plate 10 and the front guide plate 20 are mounted on the casing 2 with respective longitudinally opposite ends of these guide plates 10, 20 placed on the front and back top-plates 2b, 2c and fixed at the respective supporting plate portions 11a, 21a thereto by means of set screws. The rear glass supporting plate 12 and the front glass supporting plate 22 associated with these rear and front guide plates 10, 20, respectively, are offset with respect to the respective guide plates 10, 20, so the auxiliary platen glass 4 is placed and supported on these glass supporting plates 12, 22. As has already been described, under longitudinally opposite ends of the auxiliary platen glass 4 so mounted are strips of spongy rubber.

Even if a load tending to flex the auxiliary platen glass 4 is unintentionally exerted on the auxiliary platen glass 4 mounted in the manner as has been described above, there is no anxiety that the auxiliary platen glass 4 might be flexed. This is for the reason that the auxiliary platen glass 4 is supported by the relatively thin (1 mm) glass supporting plates 12, 22 which are, in turn, supported by the relatively thick (3 mm) plates 11, 21 directly supported on the casing 2, respectively. In this way, it is not apprehended that the auxiliary platen glass 4 can flex and might be damaged.

The glass supporting plates 12, 22 are sufficiently thin and shaped to lower the level at which the auxiliary platen glass 4 is positioned and, therefore, minimize the distance between the light source lamp and the original. In this way, it is possible to irradiate the original with sufficiently intense light beam to obtain the sharp and clear image data.

Figure 6:
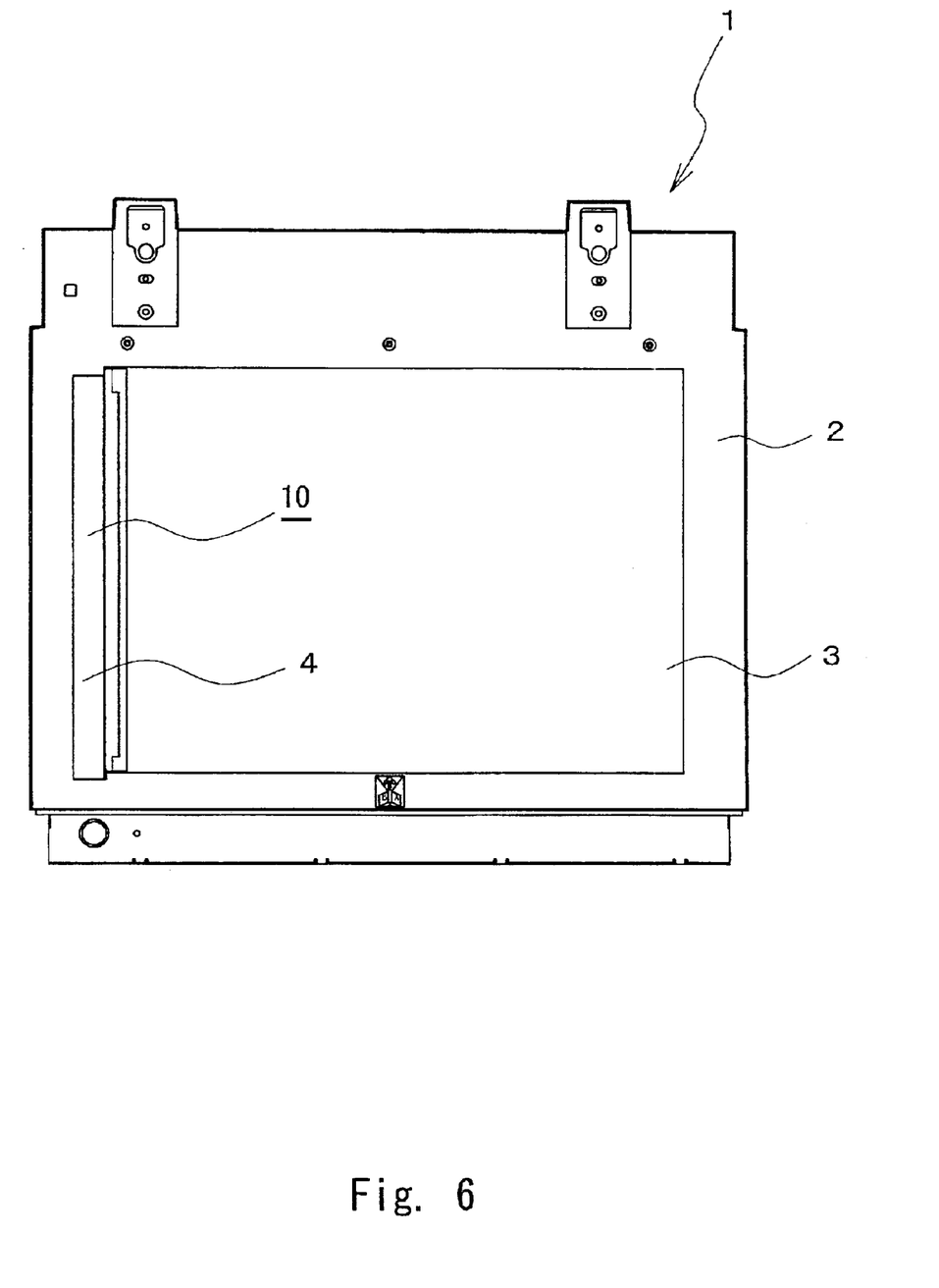
FIG. 6 is a top plan view illustrating one preferred embodiment of the mechanism according to the present invention for retaining the platen glass used to read the original in the course of being fed, with this platen glass mounted on the image reader.
Figure 7:
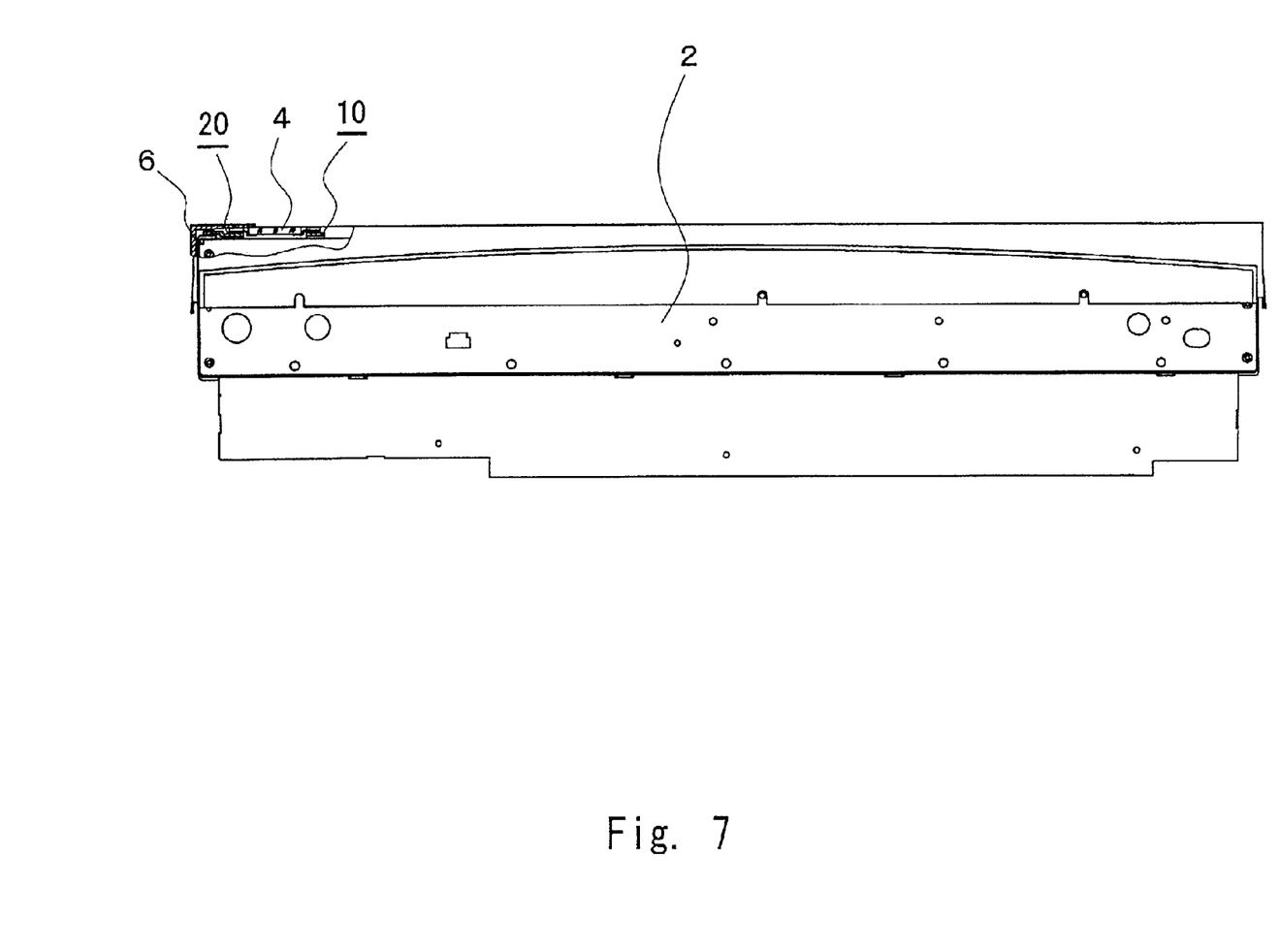
FIG. 7 is a front view of the casing shown in FIG. 6.
Figure 9:
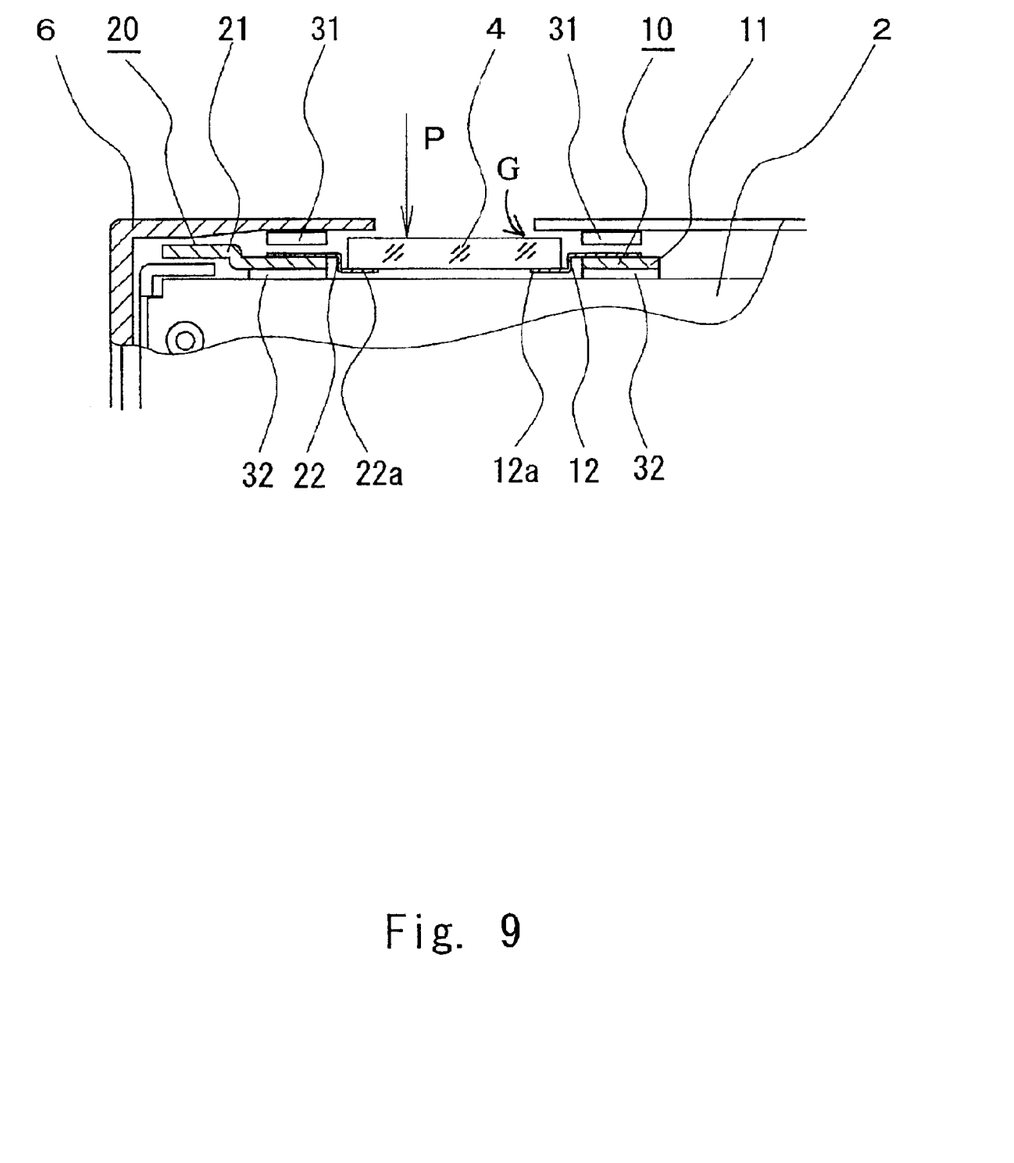
FIG. 9 is a view similar to FIG. 8 shown with the casing covered with the lid and loaded therewith.

FIGS. 6 through 8 illustrate one preferred embodiment in which the components or elements similar to those in the embodiment illustrated in FIGS. 1 through 5 are designated by the similar reference numerals. The cover 6 is provided at positions on its bottom surface which are opposed to the rear and front glass supporting plates 12, 22 with magnets 31 (FIG. 8), respectively. The glass supporting plates 12, 22 are formed of a ferromagnetic material adapted to be magnetically attracted to and engaged by these magnets. With the lid opened, the glass supporting plates 12, 22 are magnetically engaged with the magnets 31, and, with the lid closed, members mounted on this lid, such as feeding roller and guide members constituting the original feeder, come in contact with the auxiliary platen glass and exert a predetermined load greater than about 50 N thereupon so that the glass supporting plates 12, 22 may be disengaged from the magnets 31, as seen in FIG. 9. The rear and front plates 11, 21 directly supported on the casing 2 are respectively provided on the bottom surfaces thereof with strips 32 of spongy rubber serving as shock absorbing means.

The mechanism shown by FIGS. 6 through 8 operates in a manner as now described. FIGS. 6 through 8 illustrate the state in which the casing 2 is not covered with the lid, i.e., the lid has been opened to set the original on the main platen glass 3 and the glass supporting plates 12, 22 on which the auxiliary platen glass 4 is placed are in magnetic engagement with the respective magnets 31. In this state, the glass supporting plates 12, 22 are slightly spaced (FIG. 8) from the plates 11, 21 directly supported on the casing 2, respectively.

With the auxiliary platen glass 4 is in close contact with the cover 6 as seen in FIG. 9, a load P is exerted upon the auxiliary platen glass 4 as the lid is closed onto the casing 2. Consequently, the glass supporting plates 12, 22 are disengaged from the magnets 31, and the auxiliary platen glass 4 is moved downwardly. Thereupon, the glass supporting plates 12, 22 are placed and supported on the plates 11, 21 directly supported on the casing 2, respectively, as seen in FIG. 9. Such arrangement ensures that the auxiliary platen glass 4 can be properly positioned and an appropriate gap (G in FIG. 9) can be established between the top surface of the auxiliary platen glass 4 and the original feeder mechanism. Thus, the original can be smoothly fed through this gap. In addition, for the original which is relatively thick, the respective strips 32 of spongy rubber can be correspondingly compressed and the auxiliary platen glass 4 also is appropriately depressed. In this manner, even if the original is relatively thick, there is no anxiety that feeding of the original might be thereby obstructed.

When the image reader is used as that of stationary original type, the lid is opened to place the original on the main platen glass 3. The load which has been exerted on the auxiliary platen glass is thereupon removed and the glass supporting plates 12, 22 are magnetically engaged with the magnets 31 as seen in FIG. 8. At the same time, the auxiliary platen glass 4 is moved upwardly and the gap between the auxiliary platen glass 4 and the cover 6 is eliminated. Therefore, the original cannot be inserted between the auxiliary platen glass 4 and the cover 6 even if the original is carelessly moved toward the auxiliary platen glass.

While the embodiment illustrated by FIGS. 6 through 9 has been described above with respect to the mechanism used to irradiate the original with light beams in the course of being fed in the image reader 1, such mechanism is useful in a structure such that a predetermined plate-like member should be moved from a predetermined position to the other position under a desired load and this plate-like member should be moved back to the predetermined position as the load is removed.

As will be apparent from the foregoing description, the mechanism according to the present invention for retaining the platen glass exclusively used to read the original in the course of being fed in the image reader allows the original to be irradiated with the light beams of high brightness since the platen glass used to read the original in the course of being fed can be put to the light source lamp as closely as possible. Additionally, this mechanism enables the image reader to be miniaturized, since the lid is moved downwardly and the platen glass is moved downwardly.

Furthermore, the mechanism according to the present invention for retaining the platen glass exclusively used to read the original in the course of being fed in the image reader allows the original to be smoothly fed, since the platen glass is moved downwardly to form an appropriate gap between the platen glass and the original feeder mechanism provided on the lid when a load higher than a predetermined value is exerted on the mechanism. Upon removal of the load, the platen glass is moved upwardly under the magnetic force of the magnets until the platen glass comes in close contact with the members, such as a glass retaining member of the image reader, whereupon the above-described gap is eliminated. This feature also is effective to prevent a stationary original from being carelessly inserted into the gap. Particularly, an arrangement such that the load higher than the predetermined value is exerted upon the mechanism as the lid is closed facilitates the image reader to be handled, since the platen glass is moved as the lid is opened or closed.

Furthermore, the mechanism according to the present invention for retaining the platen glass exclusively used to read the original in the course of being fed in the image reader is free from the apprehension that the platen glass might be flexed even when undesirable load is carelessly exerted upon the platen glass, since such load is absorbed by the shock absorbing means.

Moreover, the mechanism according to the present invention for retaining the plate-like member is applicable to the mechanism arranged so that the plate-like member is moved away from a predetermined position under a load higher than a predetermined value of about 50 N and, upon removal of such load, the plate-like member is moved back to the predetermined position.

It will become apparent to those skilled in the art that various modifications to the preferred embodiment of the invention as described herein can be made without departing from the spirit or scope of the invention as defined by the appended claims.

What is claimed is:

1. A mechanism for retaining a platen glass used to read an original in the course of being fed in an image reader having a frame and adapted to irradiate said original with light beams from a light source lamp placed at a predetermined position, to pick up light beams reflected on said original and thereby to read an image formed on said original, comprises:

a platen glass functioning to guide an original in an appropriately stretched and flattened state in the course of feeding the original; and retaining means comprising a platen glass supporting member having one end on which said platen glass is placed and supported and a member on which the other end of said glass supporting member is placed which is supported on said frame, wherein said glass supporting member is formed of a relatively thin plate material and said member to be supported on the frame of the image reader is formed of a relatively thick plate material, and further including decoupling structure which allows said platen glass to move toward the light source lamp upon the application of a predetermined force on said platen glass.

2. The mechanism as defined in claim 1 wherein said frame has a thickness of about 3 mm and said glass supporting member has a thickness of about 1 mm.

3. The mechanism for retaining a platen glass used to read an original in the course of being fed in an image reader according to claim 1, and further including shock absorbing means interposed between said member supported directly on said frame and the frame.

4. A mechanism for retaining a platen glass used to read an original in the course of being fed in an image reader having a frame and adapted to irradiate said original with light beams from a light source lamp placed at a predetermined position, to pick up light beams reflected on said original and thereby read an image formed on said original, comprising:

a platen glass functioning to guide an original in an appropriately stretched and flattened state in the course of feeding the original;

retaining means comprising a platen glass supporting member having one end on which said platen glass is placed and supported and a member on which the other end of said glass supporting member is placed and which is supported directly on said frame, wherein said glass supporting member is formed of a relatively thin plate material and said member supported directly on the frame is formed of a relatively thick plate material; and a magnet positioned above said other side of said glass supporting member so that said glass supporting member is spaced from said member supported directly on said frame as said glass supporting member is magnetically engaged with said magnet and said glass supporting member is released from the magnetic force of said magnet and placed on said member supported directly on said frame as a load higher than a predetermined value is exerted upon the platen glass.

5. The mechanism for retaining a platen glass used to read an original in the course of being fed in an image reader according to claim 4, and further including shock absorbing means interposed between said member supported directly on said frame and the frame.

6. A mechanism for retaining a platen glass of an image reader at a first desired position in the absence of a load higher than a predetermined value and to move said platen glass from said first desired position to another position in the presence of the load higher than the predetermined value and to move said plate-like member, upon removal of said load higher than the predetermined value, back to said first desired position, comprising:

a platen glass including a plate-like member formed of a magnetic material;

a magnet positioned to be aligned with said plate-like member, such that said plate-like member is magnetically engaged with said magnet to hold said platen glass in a first position; and under a load higher than a predetermined value, said platen glass is disengaged from the magnetic force of said magnet and moves to a second position and, upon removal of said load, said plate-like member of said platen glass is again magnetically engaged with said magnet to return said platen glass to said first position.

7. The mechanism as defined in claim 6 wherein said predetermined value of said load is about 50 N.

8. An image reader comprising:

a frame;

a platen glass;

a retainer including a glass supporting member having one end on which said platen glass is placed; and a member on which the other end of said glass supporting member is placed and supported and which is supported on said frame, wherein said glass supporting member is formed of a relatively thin plate material and said member to be supported on said frame is formed of a relatively thick plate material, and wherein there is provided a magnet above said other end of said glass supporting member so that said glass supporting member is spaced from said member supported directly on said frame as said glass supporting member is magnetically engaged with said magnet and said glass supporting member is released from a restrain under a magnetic force of said magnet and placed on said member supported directly on said frame as a load higher than a predetermined value is exerted upon the platen glass.

9. The image reader as defined in claim 8 and further including shock absorbing strips interposed between said member supported directly on said frame and said frame.

10. The image reader as defined in claim 9 wherein said predetermined value of said load is about 50 N.

* * * * *